United States Patent [19]

Watson

[11] 4,379,331

[45] Apr. 5, 1983

[54] FAILURE WARNING FOR A VEHICLE INFORMATION PROCESSING SYSTEM

[75] Inventor: Peter M. F. Watson, Wokingham, England

[73] Assignee: Minister of Transport in Her Britannic Majesty's Government of the United Kingdom of Great Britain and Northern Ireland, London, England

[21] Appl. No.: 179,223

[22] Filed: Aug. 18, 1980

[30] Foreign Application Priority Data

Aug. 23, 1979 [GB] United Kingdom ................. 7929410

[51] Int. Cl.³ .......................... G06F 11/32; B60T 8/00
[52] U.S. Cl. .................................. 364/426; 340/52 R; 340/52 B; 371/72
[58] Field of Search .................... 364/426; 371/60, 66, 371/72; 340/52 R, 52 B, 62, 653, 670; 324/160–162; 303/92; 180/282

[56] References Cited

U.S. PATENT DOCUMENTS

| | | | |
|---|---|---|---|
| 3,704,445 | 11/1972 | Lanham | 324/161 X |
| 3,909,606 | 9/1975 | Shibata et al. | 371/72 |
| 3,911,392 | 10/1975 | Fleagle | 340/52 B |
| 3,919,537 | 11/1975 | Bynum | 364/426 X |
| 4,013,324 | 3/1977 | Quon | 303/92 |
| 4,018,486 | 4/1977 | Sutton | 303/92 X |
| 4,098,542 | 7/1978 | Rasput et al. | 303/92 |
| 4,109,235 | 8/1978 | Bouthors | 340/52 F |
| 4,252,014 | 2/1981 | Ruof | 340/52 B X |

FOREIGN PATENT DOCUMENTS 1458968 12/1976 United Kingdom ................. 303/92

Primary Examiner—Jerry Smith
Attorney, Agent, or Firm—Cushman, Darby & Cushman

[57] ABSTRACT

A failure warning system for a wheeled vehicle which has an information processor for processing wheel rotation information. The system is applicable to a vehicle having an anti-skid or brake anti-lock device and which also has a bar light speedometer display. The power supply for the display derives from a point in the processor which is live at all times when the processor is functioning normally. Malfunction in the processor which causes loss of processor signal results in a null speedometer reading. A failure warning is thereby provided with a minimum of additional hardware which permits a minimum of difficulty in failure detection in the processor.

5 Claims, 1 Drawing Figure

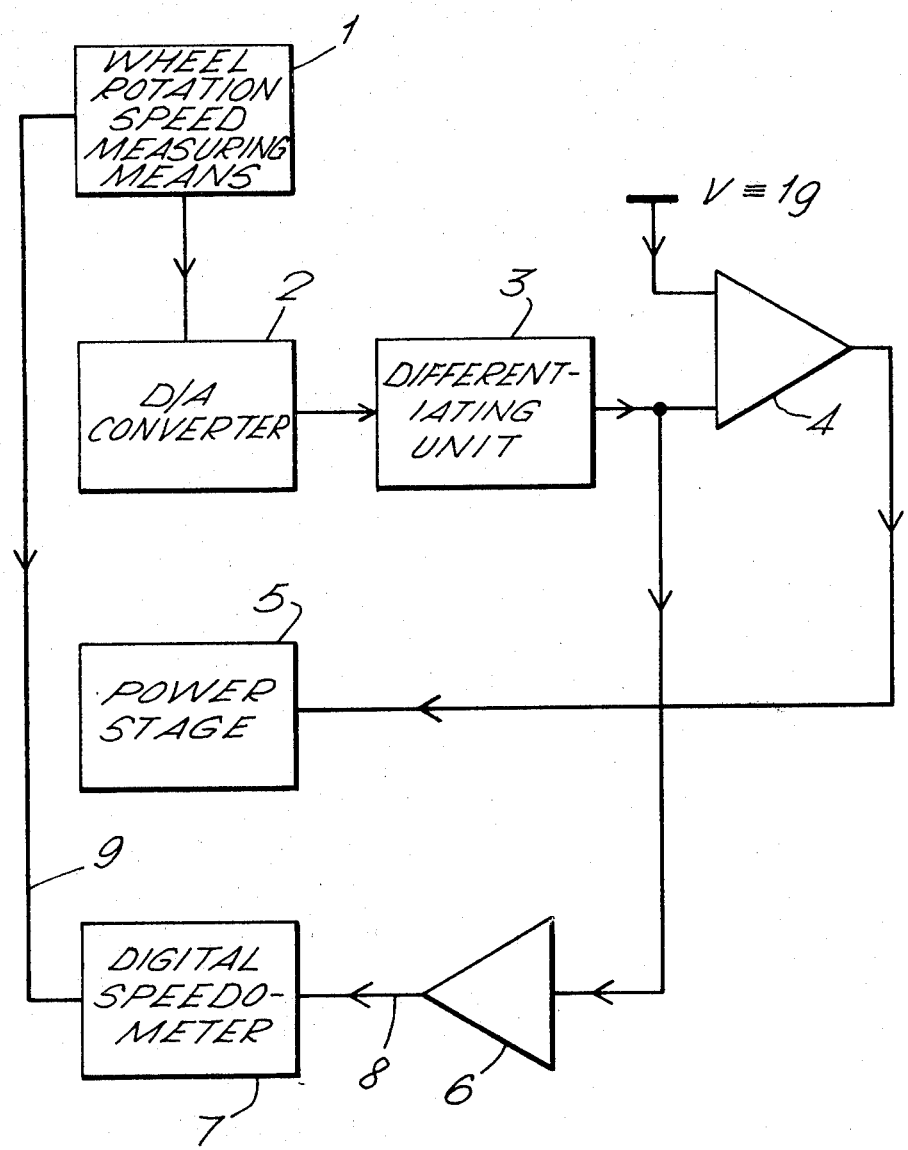

FAILURE WARNING FOR A VEHICLE INFORMATION PROCESSING SYSTEM

The invention concerns improvements in or relating to failure warning means and particularly, but not exclusively, to a signal or data processing system failure warning means in a vehicle having a speedometer.

Anti-lock brake systems have been used on wheeled road vehicles in the past in order to control locking of the wheels at times when friction between the wheels and the road is less than optimum, for instance in wet weather. Successful operation of a typical anti-lock system depends upon the correct monitoring and processing of the speed of rotation of the wheels.

A second known system which relies upon correct monitoring and processing of wheel speed is a skid controller for wheeled vehicles wherein a throttle-release is activated when the wheel acceleration exceeds a predetermined value.

In the past, the checking of the anti-lock system has been a major task involving removal of the circuitry from the vehicle, its connection to a specially designed testing circuit and finally its replacement back into the vehicle. Such checking is time consuming and also requires complicated testing apparatus. An additional disadvantage is that the circuitry cannot be tested whilst still installed in the vehicle. Consequently, difficulties may arise from faults in the connections between the testing circuit and the anti-lock circuitry and also from undiagnosable faults arising from connections made between the anti-lock circuitry and the vehicle when replacing the anti-lock circuitry in the vehicle. There may also be undiagnosable faults due to local inclement conditions in the vehicle. In addition, faults arising in the testing circuit itself must be eliminated. Testing and maintenance of the testing circuit is therefore required.

The purpose of the invention is to provide a fault detection means which is operative while the system is connected in the vehicle in its operating condition, thus facilitating servicing.

According to the present invention there is provided for a vehicle a signal or data processing system failure warning means comprising:

a speedometer, a controller having means for processing vehicle signals or data, error detection means associated with the controller for producing, in response to an error detected in the controller, a visible change in the speedometer reading.

The system may comprise a circuit for anti-lock brakes in a wheeled vehicle in which signals representing measured wheel rotation speed are fed to the controller which processes them to calculate wheel deceleration, compares the wheel deceleration with a predetermined maximum deceleration and causes brake pad pressure to be reduced if the wheel deceleration exceeds the predetermined maximum.

Alternatively, the system may comprise a circuit for an anti-skid means in a wheeled vehicle in which signals representing measured wheel rotation speed are fed to the controller which processes them to calculate wheel acceleration, compares the wheel acceleration with a predetermined maximum acceleration and causes a throttle release mechanism to be activated if the wheel acceleration exceeds the predetermined maximum acceleration.

Preferably the speedometer is a digital speedometer having a numerical display with the numerical digits formed by light-emitting means. An error detection may therefore be indicated by lack of a reading on the speedometer.

The invention will now be described by way of example only with reference to the accompanying drawing comprising:

FIG. 1 which is a block diagram illustrating parts of the electronic circuitry in an anti-lock disc brake system for a front wheel of a motorcycle having a digital speedometer.

In FIG. 1 block 1 is a front wheel rotation speed measuring means which produces an output in digital form representing the wheel speed of the motorcycle. The output is passed to a digital-to-analogue converter, 2, which converts the digital speed signal to an analogue signal. The analogue signal is then passed to a differentiating unit, 3, which outputs a signal at a voltage of 8 volts representing wheel deceleration to a comparator stage 4, which compares the wheel deceleration signal voltage with a constant voltage, V, representative of a deceleration of 1 g. If the deceleration exceeds 1 g ie S is greater than V, the comparator stage sends a signal to a power stage 5, which includes amplifiers and magnetostrictive electric-to-sound transducers connected to brake pads which are engagable to a disc on the front wheel for braking action.

The signal from the comparator is amplified in the amplifiers and used to activate the magnetostrictive transducers. Under excessive deceleration the brake pads are therefore caused to vibrate which, during braking, results in a reduction of friction between the pads and the disc and reduces any locking of the wheels.

If the wheel deceleration does not exceed 1 g ie S is not greater than V, a signal is not output from the comparator stage to the power stage.

The output of the differentiating unit, 3, is also connected through a speedometer amplifier stage, 6, by a line connection, 8, to a digital speedometer, 7, having a 7-bar-light digital display to give a numerical visual display of speed. Power for the bar lights is supplied via line connection 8 and the motorcycle wheel speed information is supplied to the speedometer via connection 9 which interconnects the front wheel rotation speed measuring means, 1, and the speedometer.

If information is not being output by the differentiating unit ie there is a zero line connection voltage, as would be the case if there was a fault in stages 1, 2 or 3 of the anti-lock brake circuit, there is no power supply to the digital speedometer display and the speedometer does not therefore register a speed. A driver of the motorcycle is thus readily alerted to the fact that the anti-lock system is malfunctioning.

The circuit described in this embodiment exploits the advantage that a driver of a motorcycle frequently looks at the speedometer. Failure of the anti-lock system is therefore quickly brought to the driver's attention.

A second advantage in the above embodiment is that faults in all stages of the circuitry except the power and comparator stages can be diagnosed while the anti-lock circuit is incorporated in the motorcycle in operational conditions, thus making servicing relatively easy.

The connection between the differentiating unit output and the speedometer may be effected in a way different to that described in the embodiment so as to give a different manner of indicating a lack of data output from the differentiating unit. The connection may be such as to cause the speedometer display to be switched alternately off and on. The power line connection to the speedometer display may originate other than from the output of the differentiating unit. It may, for instance, originate from the digital-to-analogue converter output. Failure in only block 1 and 2 of the anti-lock circuitry would therefore be registered. Alternatively, the power line connection may originate from other points in the circuitry thus giving a failure warning means for other combinations of stages in the anti-lock system.

The circuit may be more complicated, for instance by having a wheel rotation speed measuring means which monitors rotation speed of both wheels of the motorcycle and derives an overall speed by taking an average of the two speeds.

The scope of the invention is not confined to the above embodiment. The invention may be applied to an electronic circuit in, for instance, a car. The electronic circuit may comprise an anti-skid system for a wheeled vehicle with a wheel rotation speed acquisition stage connected to a differentiating unit having an output to a comparator which provides a signal to a throttle-release stage if wheel acceleration exceeds a predetermined maximum. The output from the differentiating unit may be connected to the speedometer in such a way as to produce a speedometer visual display indicative of no signal data being output from the differentiating unit.

What is claimed is:

1. A failure warning means for a vehicle wheel rotation control system including:
    a wheel rotation control section for processing wheel rotation information signals and providing wheel rotation control signals;
    a speedometer;
    a speedometer power line for supplying a driving voltage to the speedometer to give a speedometer reading;
    wherein the speedometer power line connects the speedometer and a point in the wheel rotation control section such that the speedometer driving voltage derives from signals in the wheel rotation control section so that failure of the control section produces a null speedometer reading.

2. A failure warning means for a vehicle wheel rotation control system as in claim 1 wherein said wheel rotation control section comprises a section for controlling the locking of the vehicle brakes.

3. A failure warning means for a vehicle wheel rotation control system as in claim 2 comprising:
    an information correlation section for correlating said wheel rotation information signals; and
    connected for transmission of voltage signals via an intermediary connection to;
    a comparator stage which is connected to;
    a power stage such that, when wheel deceleration exceeds a predetermined maximum, a signal is transmitted from said comparator stage to said power stage which causes brake pressure to be reduced; and
    wherein said power line connects said intermediary connection and said speedometer.

4. A failure warning means for a vehicle wheel rotation control system as in claim 1, wherein said wheel rotation control section comprises a section for controlling vehicle skidding.

5. A failure warning means for a vehicle wheel rotation control system as in claim 4 comprising:
    an information correlation section for correlating said wheel rotation information signals; and
    connected for transmission of voltage signals via an intermediary connection to;
    a comparator stage which is connected to;
    a power stage coupled to a throttle control such that, when wheel acceleration exceeds a predetermined maximum, a signal is transmitted from said comparator stage to said power stage which causes throttle power to be reduced; and
    wherein said power line connects said intermediary connection and said speedometer.

* * * * *